(12) United States Patent
Ogita et al.

(10) Patent No.: US 10,901,814 B2
(45) Date of Patent: Jan. 26, 2021

(54) INFORMATION PROCESSING APPARATUS AND INFORMATION PROCESSING METHOD

(71) Applicant: SONY CORPORATION, Tokyo (JP)

(72) Inventors: Takeshi Ogita, Tokyo (JP); Ikuo Yamano, Tokyo (JP); Ayumi Nakagawa, Kanagawa (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,427

(22) PCT Filed: Aug. 4, 2017

(86) PCT No.: PCT/JP2017/028445
§ 371 (c)(1),
(2) Date: Feb. 14, 2019

(87) PCT Pub. No.: WO2018/051676
PCT Pub. Date: Mar. 22, 2018

(65) Prior Publication Data
US 2019/0213059 A1    Jul. 11, 2019

(30) Foreign Application Priority Data

Sep. 14, 2016 (JP) .................. 2016-179485

(51) Int. Cl.
*G06F 9/54* (2006.01)
*G06F 3/01* (2006.01)
*G06F 3/0488* (2013.01)

(52) U.S. Cl.
CPC ............ *G06F 9/542* (2013.01); *G06F 3/01* (2013.01); *G06F 3/011* (2013.01); *G06F 3/016* (2013.01); *G06F 3/04883* (2013.01)

(58) Field of Classification Search
CPC ..................................................... G06F 3/016
See application file for complete search history.

(56) References Cited

U.S. PATENT DOCUMENTS

| 2015/0302709 A1* | 10/2015 | Fadell | ............. G08B 6/00 340/407.1 |
|---|---|---|---|
| 2016/0132114 A1* | 5/2016 | Rihn | ............. A63F 13/24 345/156 |

(Continued)

FOREIGN PATENT DOCUMENTS

| CN | 106200862 A | 12/2016 |
|---|---|---|
| JP | 11331407 A | 11/1999 |

(Continued)

OTHER PUBLICATIONS

International Search Report and Written Opinion of PCT Application No. PCT/JP2017/028445, dated Oct. 17, 2017, 9 pages of ISRWO.

*Primary Examiner* — Brian W Wathen
(74) *Attorney, Agent, or Firm* — Chip Law Group

(57) ABSTRACT

This information processing apparatus includes a vibration device. The information processing apparatus further includes a control unit that detects a tap operation of a user for instructing to perform information notification. The control unit further generates notification information when the tap operation is detected. The control unit further converts the generated notification information into a vibration waveform, and causes the vibration device to vibrate in the vibration waveform.

12 Claims, 13 Drawing Sheets

(56) References Cited

U.S. PATENT DOCUMENTS

| | | | |
|---|---|---|---|
| 2016/0212710 A1* | 7/2016 | Ting | H04W 52/0254 |
| 2017/0083096 A1* | 3/2017 | Rihn | G06F 3/016 |
| 2017/0201481 A1* | 7/2017 | Bisarya | H04L 67/306 |
| 2017/0212591 A1* | 7/2017 | Churikov | G06F 3/0488 |
| 2017/0257492 A1* | 9/2017 | Levesque | H04M 19/04 |
| 2017/0358181 A1* | 12/2017 | Moussette | G06F 3/016 |
| 2018/0067555 A1* | 3/2018 | Chaudhri | G06F 3/0485 |
| 2018/0299996 A1* | 10/2018 | Kugler | G06F 1/169 |

FOREIGN PATENT DOCUMENTS

| | | |
|---|---|---|
| JP | 2000-180565 A | 6/2000 |
| JP | 2001-069235 A | 3/2001 |
| JP | 2013-045303 A | 3/2013 |
| JP | 2015-207242 A | 11/2015 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/028445 filed on Aug. 4, 2017, which claims priority benefit of Japanese Patent Application No. JP 2016-179485 filed in the Japan Patent Office on Sep. 14, 2016. Each of the above-referenced applications is hereby incorporated herein by reference in its entirety.

TECHNICAL FIELD

The present invention relates to an information processing apparatus such as a mobile device, an information processing method, and a program, for example.

BACKGROUND ART

Some of mobile devices such as a smartphone, a mobile phone, and a portable music player are configured to transmit a notification of information, an operation response, and the like to the user through vibration. For example, there are known a technology of providing a feed-back to the user through vibration of a vibration device such as a vibration motor when a determination operation by pushing an operation surface of the mobile device is detected by a pressure-sensitive sensor and the like (see Patent Literature 1).

CITATION LIST

Patent Literature

Japanese Patent Application Laid-open No. 2011-59821 (Paragraph [0052])

DISCLOSURE OF INVENTION

Technical Problem

In order for the user to receive notifications of various types of information from an information processing apparatus such as the mobile device, it is typically necessary to perform a user's action of looking at a display and checking displayed notification information. However, there is a fear that the user cannot immediately receive the notification information because it is difficult for the user to look at the display in some situations, for example, which is a point that should be improved.

In view of the above-mentioned circumstances, it is an object of the present technology to provide an information processing apparatus, an information processing method, and a program with which user's operability regarding information notification to the user can be improved.

Solution to Problem

In order to solve the above-mentioned problem, an information processing apparatus according to the present technology includes: a vibration device that generates vibration; and a control unit that detects a tap operation of a user for instructing to perform information notification, generates notification information when the tap operation is detected, converts the generated notification information into a vibration waveform, and causes the vibration device to vibrate in the vibration waveform.

The control unit may be configured to determine whether the information processing apparatus is put in a pocket of the user and start detection of the tap operation if it is determined that the information processing apparatus is put in the pocket of the user.

The control unit may be configured to convert the notification information into one or more vibration waveforms distinguishable on the basis of at least a vibration time.

In addition, the information processing apparatus according to the present technology may further include a pressure-sensitive sensor that detects a pressure applied on the information processing apparatus, in which the control unit may be configured to control the vibration device such that vibration intensity becomes higher as the detected pressure becomes lower.

In addition, in the information processing apparatus according to the present technology, the control unit may be configured to acquire information regarding a noise level and control the vibration device such that the vibration intensity becomes higher as the noise level becomes higher.

Further, the control unit may be configured to acquire location information, search, on the basis of the acquired location information, a database in which information regarding a noise level in each location is stored, and acquire the information regarding the noise level corresponding to the acquired location information.

Alternatively, the control unit may be configured to determine whether the information processing apparatus is moving and control the vibration device such that the vibration intensity becomes higher if the information processing apparatus is moving.

The control unit may be configured to convert the notification information into one or more vibration waveforms distinguishable on the basis of the vibration time and the vibration amplitude.

The control unit may be configured to convert the notification information into a sequence of one or more vibration waveforms distinguishable on the basis of a vibration time and a vibration frequency.

Further, an information processing method of another embodiment according to the present technology includes: by a control unit, detecting a tap operation of a user for instructing an information processing apparatus including a vibration device that generates vibration to perform information notification; generating notification information when the tap operation is detected; converting the generated notification information into a vibration waveform; and causing the vibration device to vibrate in the vibration waveform.

In addition, a program of another embodiment according to the present technology causes a computer to operate as a control unit that detects a tap operation of a user for instructing an information processing apparatus including a vibration device that generates vibration to perform information notification, generates notification information when the tap operation is detected, converts the generated notification information into a vibration waveform, and causes the vibration device to vibrate in the vibration waveform.

Further, an information processing apparatus of another embodiment according to the present technology includes a control unit that detects a tap operation of a user for instructing an information processing terminal including a vibration device that generates vibration to perform information notification, generates notification information when the tap operation is detected, converts the generated notification information into vibration waveform information of the vibration device, and performs control to send the converted vibration waveform information to the information processing terminal.

Advantageous Effects of Invention

As described above, in accordance with the present technology, it is possible to improve user's operability regarding information notification to the user.

MODE(S) FOR CARRYING OUT THE INVENTION

Hereinafter, embodiments of the present technology will be described with reference to the drawings.

First Embodiment

This embodiment relates to an information processing apparatus such as a portable mobile device and, in particular, applies the present technology to a smartphone which the user can put in a pocket of clothes or a bag and carry.

[Configuration of Information Processing Apparatus]

Figure 1:
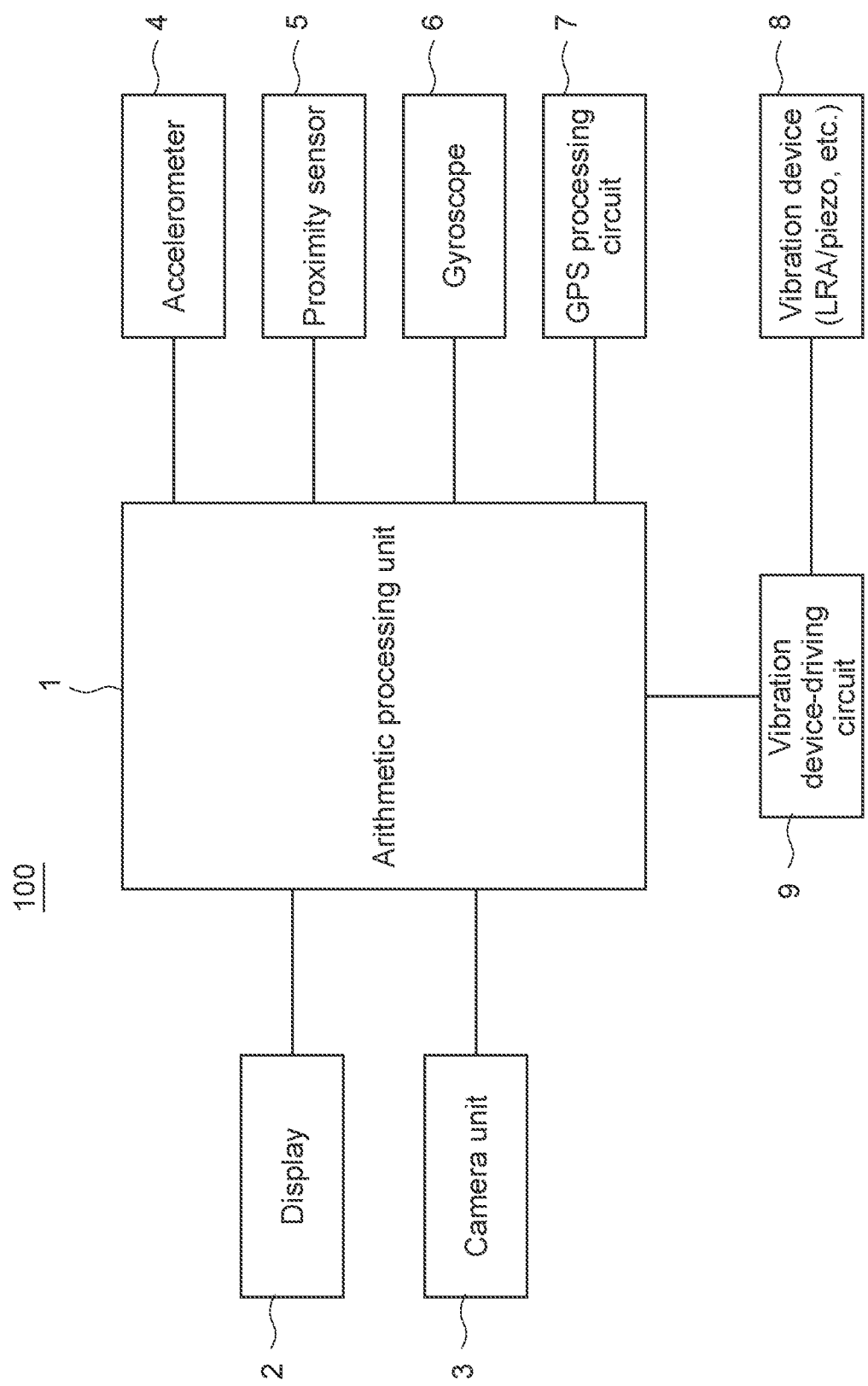
FIG. 1 A block diagram showing a configuration of hardware of an information processing apparatus of a first embodiment according to the present technology.

FIG. 1 is a block diagram showing a configuration of hardware of an information processing apparatus of a first embodiment according to the present technology.

As shown in the figure, this information processing apparatus 100 includes an arithmetic processing unit 1, a display 2, a camera unit 3, an accelerometer 4, a proximity sensor 5, a gyroscope 6, a GPS processing circuit 7, a vibration device 8, a vibration device-driving circuit 9, and the like.

The arithmetic processing unit 1 includes a central processing unit (CPU), a random access memory (RAM), a read only memory (ROM), a flash ROM, and the like. The CPU executes arithmetic processing for executing an operating system and an application program which are loaded into a main memory area of the RAM from the ROM and the flash ROM. Specifically, the CPU performs display control on the display 2 connected to the arithmetic processing unit 1, processing of a video taken by the camera unit 3, processing of acceleration data generated by the accelerometer 4, processing of proximity data generated by the proximity sensor 5, processing of angular acceleration data generated by the gyroscope 6, processing of GPS information obtained by the GPS processing circuit 7, and the like. In addition, the CPU controls the vibration device-driving circuit 9 to cause the vibration device 8 to vibrate in a desired vibration waveform.

The display 2 includes a panel-type display device that displays an image and a display-driving circuit that generates a signal to be output to the display device on the basis of display data supplied from the arithmetic processing unit 1. It should be noted that the display device of the display 2 may be provided with a touch sensor panel that generates a signal of coordinates touched by the user and supplies it to the arithmetic processing unit 1.

The camera unit 3 includes an optical system such as an objective lens and an imaging lens, an image pickup element such as a complementary metal oxide semiconductor (CMOS) sensor and a charge coupled device (CCD) image sensor that converts light captured through this optical system into an electrical signal, and a video signal processing circuit that generates video data on the basis of a signal captured by this image pickup element and supplies it to the arithmetic processing unit 1.

The accelerometer 4 is a sensor that detects acceleration in three-axis directions (xyz-axis directions), which is applied on the information processing apparatus 100. It is assumed that vertical and horizontal two axis directions on the screen of the display 2 of the information processing apparatus 100 are an x-axis direction and a y-axis direction and a direction orthogonal to the x-axis direction and the y-axis direction is a z-axis direction. The arithmetic processing unit 1 is configured to detect a tap operation of lightly tapping the information processing apparatus 100 put in the pocket of the clothes of the user or the like with a hand on the clothes on the basis of detected signals from the accelerometer 4 and the like.

The proximity sensor 5 is a sensor for detecting that an object approaches a surface on the side of the display 2 of the information processing apparatus 100. When an approaching object is detected by the proximity sensor 5, the arithmetic processing unit 1 turns off display of the display 2 and turns on the operation of the touch sensor panel, for example. Further, the approaching object is also detected by the proximity sensor 5 when the information processing apparatus 100 is installed in a direction to close an objective lens of the camera unit 3 or when the information processing apparatus 100 is put in the pocket or the bag. An infrared proximity sensor and the like are used as the proximity sensor 5, for example. The infrared proximity sensor includes a pair of a light-emitting element that emits an infrared ray from the surface on the side of the display 2 of the information processing apparatus 100 and a light-receiving element that receives reflected light of that infrared ray.

The gyroscope 6 is a sensor that detects an angular acceleration in a direction around an axis of each of the three axes (xyz-axes) provided in the information processing apparatus 100. Data regarding the angular acceleration detected by the gyroscope 6 is used in processing such as attitude detection and image stabilization of the information processing apparatus 100, for example, in the arithmetic processing unit 1.

The GPS processing circuit 7 performs processing of receiving the GPS information. The arithmetic processing unit 1 is also enabled to acquire external information regarding a noise level of a location indicated by the GPS information obtained by the GPS processing circuit 7 by accessing the Internet, for example, and to perform processing of determining vibration intensity favorable for the acquired noise level, for example.

The vibration device 8 is a device that generates vibration in the information processing apparatus 100. In this embodiment, the vibration device 8 having a structure capable of varying a vibration time, a vibration frequency, a vibration amplitude, and the like and generating an arbitrary vibration waveform at a high degree of freedom is used. For example, the vibration device 8 such as a linear vibrator and a piezoelectric element is used.

The vibration device-driving circuit 9 is a circuit that applies a driving signal to the vibration device 8 so as to cause the vibration device 8 to vibrate in a vibration waveform determined by the arithmetic processing unit 1.

[Information Notification Using Vibration Waveform]

The mobile device such as the smartphone is often put in the pocket of the clothes of the user, the bag, or the like and carried. In the mobile device such as the smartphone, various types of notification information are generally presented to the user through the display. Therefore, for example, in a case where the user wishes to check information regarding a time and the like while the mobile device is put in the pocket of the clothes of the user, the user needs to perform an action of taking the mobile device out of the pocket and look at the screen of the display.

In contrast, the information processing apparatus 100 of this embodiment is configured to notify the user of the information through vibration by causing the vibration device 8 to vibrate in an arbitrary vibration waveform. With this, the user can receive a notification of the information, leaving the information processing apparatus 100 in the pocket of the clothes or the like.

Figure 2:
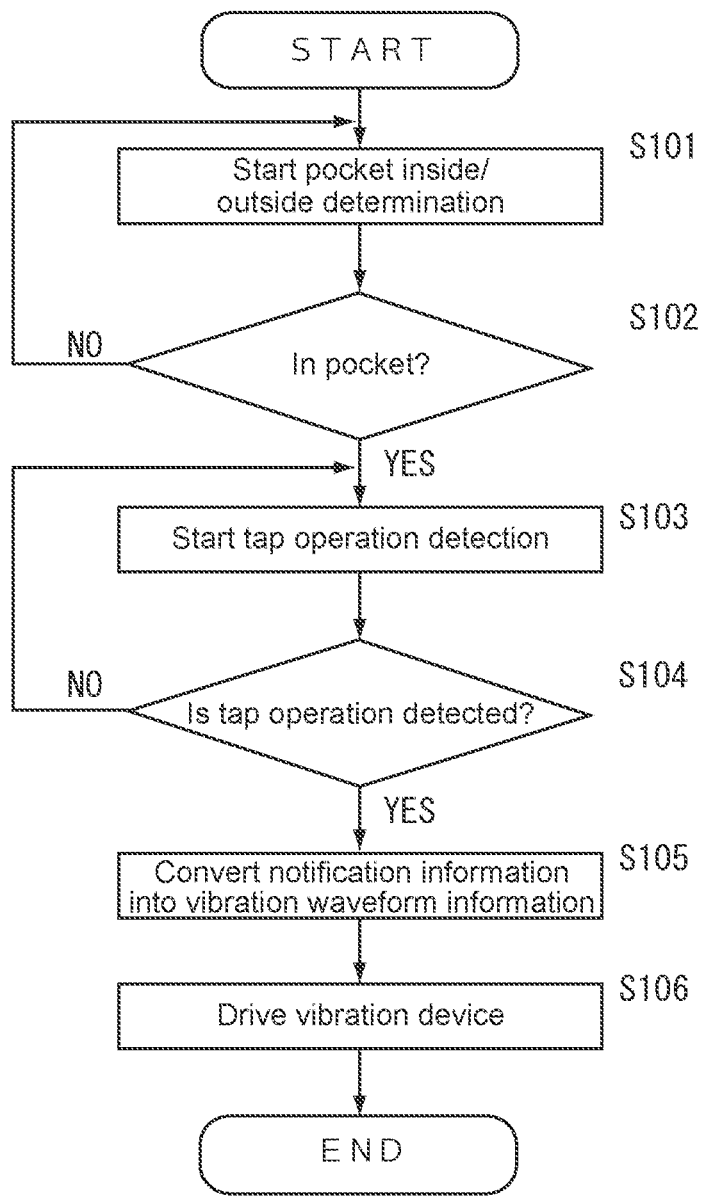
FIG. 2 A flowchart showing an operation of information notification using a vibration waveform in the information processing apparatus of this embodiment.

FIG. 2 is a flowchart showing an operation of the information notification using the vibration waveform in the information processing apparatus 100 of this embodiment.

The arithmetic processing unit 1 starts pocket inside/outside determination as to whether the information processing apparatus 100 is in the pocket (Step S101). This pocket inside/outside determination is performed on the basis of the proximity data obtained by the proximity sensor 5 and the like, for example. When the information processing apparatus 100 is in the pocket, the surface on the side of the display 2 of the information processing apparatus 100 and a cloth surface inside the pocket approach each other. Therefore, the arithmetic processing unit 1 can determine that the information processing apparatus 100 is in the pocket on the basis of the proximity data.

Further, when the information processing apparatus 100 is in the pocket, the quantity of light received by the image pickup element of the camera unit 3 significantly decreases. Therefore, the pocket inside/outside determination may be performed on the basis of a brightness value such as an average luminance of the video obtained by the camera unit 3. Alternatively, the pocket inside/outside determination may be performed by using both of the proximity data and the brightness value of the video.

In addition, the pocket inside/outside determination may be performed considering data detected by the accelerometer 4. That is, even if the approaching object is detected on the basis of the proximity data of the proximity sensor 5 and the brightness value of the video is low, it is not determined that the information processing apparatus 100 is in the pocket when it is estimated that the information processing apparatus 100 is just placed on a desk or the like on the basis of the acceleration data.

Figure 3:
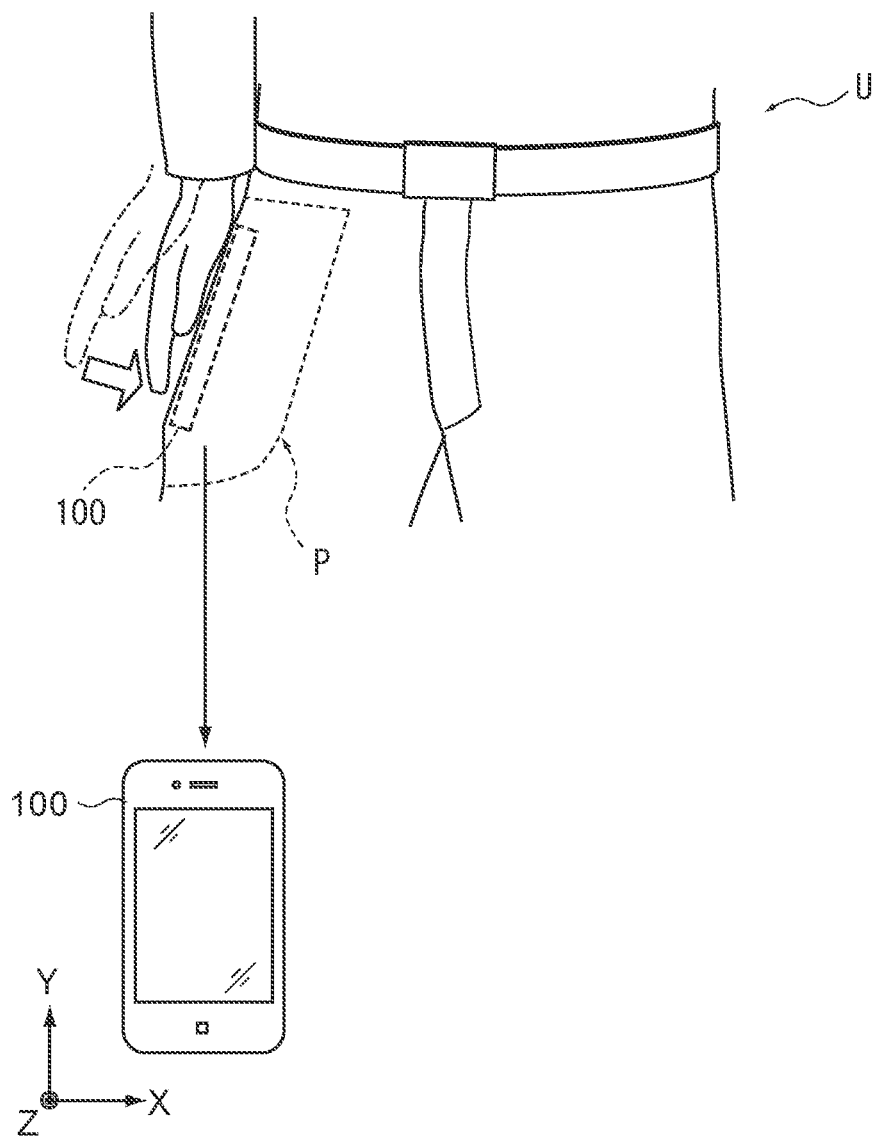
FIG. 3 A diagram showing a tap operation of the user on the information processing apparatus.

If it is determined that the information processing apparatus 100 is in the pocket (YES in Step S102), then the arithmetic processing unit 1 starts detection of a tap operation (Step S103). Here, the "tap operation" is a user's operation of lightly tapping a casing of the information processing apparatus 100 with a hand or the like. For example, as shown in FIG. 3, when the user performs the tap operation on the casing of the information processing apparatus 100 put in a pocket P of clothes of a user U, acceleration in the axis direction (z-axis direction) orthogonal to the screen of the display 2 is mainly detected by the accelerometer 4 of the information processing apparatus 100. When the detected acceleration satisfies a predetermined condition, the arithmetic processing unit 1 detects the fact that the tap operation is performed (YES in Step S104).

Figure 4:
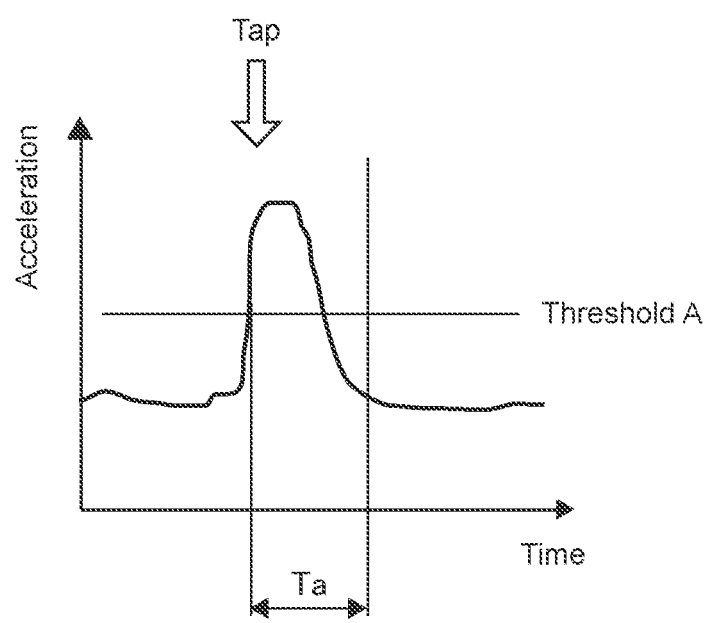
FIG. 4 A graph showing a detection condition of the tap operation.
Figure 5:
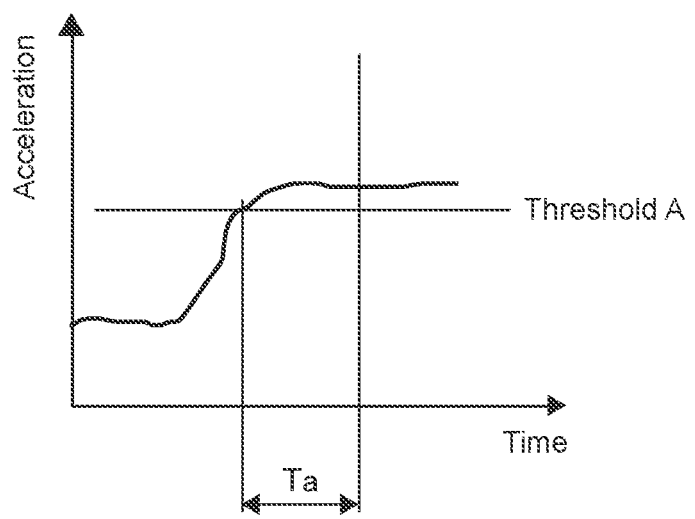
FIG. 5 A graph showing transition of a change in acceleration which is detected when the user changes direction while carrying the information processing apparatus.

Here, examples of the detection condition of the tap operation can include the fact that the acceleration reaches a threshold A and then drops below the threshold A within a certain time Ta as shown in FIG. 4 and the like. This detection condition is determined on the basis of a difference from transition of a change in acceleration detected when the user changes direction while carrying the information processing apparatus 100. That is, as shown in FIG. 5, the acceleration detected when the user changes direction while carrying the information processing apparatus 100 takes a value equal to or larger than the threshold A and then keeps the value equal to or larger than the threshold A for a time sufficiently longer than at least the above-mentioned certain time Ta. As compared to this, a period in which the acceleration in the tap operation is above the threshold A is temporary, and the tap operation can be highly accurately detected from among user's motions for operating the information processing apparatus 100 on the basis of this temporal transition difference.

It should be noted that the axis direction of the acceleration to be evaluated is not limited only to the z-axis direction and evaluation may be performed also with respect to respective acceleration in the x-axis direction and the y-axis direction.

When detecting the tap operation, the arithmetic processing unit 1 generates notification information in accordance with an application program. Here, a case where the notification information is a time is assumed. The arithmetic processing unit 1 converts generated time information into vibration waveform information (Step S105). This conversion from the notification information into the vibration waveform will be described later. The arithmetic processing unit 1 supplies control information including the generated vibration waveform information to the vibration device-driving circuit 9. The vibration device-driving circuit 9 drives the vibration device 8 in accordance with the control information including the vibration waveform information (Step S106).

Hereinabove, the information notification using the vibration waveform is performed by using the fact that the tap operation of the information processing apparatus 100 is detected as a trigger. Other triggers are as follows.

1. Using the fact that a particular motion of the information processing apparatus 100 other than the tap, such as a user's motion (shake) of shaking the information processing apparatus 100 inside the pocket, is detected as a trigger.

2. Using the fact that a particular switch button provided in the information processing apparatus 100 is pressed as a trigger.

3. Using the fact that particular location information is determined on the basis of the GPS information obtained by the GPS processing circuit 7 as a trigger. For example, the following method and the like can be exemplified. In this method, the user registers a location where it is desirable to perform the information notification using the vibration waveform in the flash ROM or the like in the arithmetic processing unit 1. Then, by using the fact that the presence in that location is determined as a trigger, the user is notified of information indicating that fact in a vibration waveform.

4. A case where a predetermined condition is established on the basis of a combination of the above-mentioned location information and particular user data may be used as a trigger. For example, when a location where payment is possible is determined by utilizing Osaifu-Keitai (registered trademark), such as a station ticket gate, the arithmetic processing unit 1 checks a remaining amount of the Osaifu-Keitai (registered trademark). By using the fact that the remaining amount is insufficient (smaller than a predetermined amount) as a trigger, the user may be notified of information indicating that fact in a vibration waveform.

5. A case where warning information of rainy, snowy, stormy, or the like, for example, is generated in a location where the user is present on the basis of weather report information externally acquired and the above-mentioned location information may be used as a trigger to cause the vibration device 8 to vibrate. At this time, the vibration device 8 may be caused to vibrate in a vibration waveform depending on kinds of weather such as rainy, snowy, and stormy.

Otherwise, the arithmetic processing unit 1 may perform notification of information using a vibration waveform when various conditions for the information notification are established. For example, the arithmetic processing unit 1 is capable of performing notification of a set time, notification of the fact that a remaining amount of a battery is small, notification of reception of mail or an SNS message, and the like.

Next, the vibration waveform and how to assign information to the vibration waveform will be described.

In the information processing apparatus 100 of this embodiment, a plurality of kinds of vibration waveforms to which respective individual pieces of information are assigned are generated on the basis of elements such as the vibration time, the vibration frequency, and the vibration amplitude.

(Numeric Expression Using Vibration Waveform)

A case where numbers used for expressing information in various situations, such as time, are used as the notification information, is assumed. In this case, even if specific vibration waveforms are assigned to ten kinds of numbers of from "0" to "9", it is not certain whether the user can correctly distinguish those ten kinds of vibration waveforms from one another. It is considered that the number of kinds of vibration waveforms which the user can easily and correctly distinguish from one another is about three at most.

In this embodiment, it is assumed that the three kinds of vibration waveforms are used as bases and the ten kinds of numbers of from "0" to "9" are assigned to one or more vibration waveforms selected from among these three kinds of vibration waveforms or a temporal sequence of a plurality of selected vibration waveforms sandwiching a non-vibration period therebetween. It should be noted that the vibration frequency and the vibration amplitude of the three kinds of vibration waveforms having different vibration times may be the same or may be different.

Here, a case where the ten kinds of numbers are expressed by using the three kinds of vibration waveforms having different vibration times will be described. The same applies to a case of using three kinds of vibration waveforms having different vibration frequencies or different vibration amplitudes.

A case where a 0.1-second vibration waveform, a 0.2-second vibration waveform, and a 0.5-second vibration waveform are employed as the three kinds of vibration waveforms having different vibration times is assumed.

"Zero (0)" of the ten kinds of numbers is assigned to the 0.1-second vibration waveform.

The numbers "1" to "4" are assigned to the 0.2-second vibration waveform, corresponding to the number of times thereof. For example, two 0.2-second vibration waveforms mean the number "2".

"Five (5)" is assigned to the 0.5-second vibration waveform. The numbers "6" to "9" are expressed by a temporal sequence of a 0.5-second vibration waveform and one or more 0.2-second vibration waveforms. For example, "7" is expressed by a 0.5-second vibration waveform and two 0.2-second vibration waveforms.

A first non-vibration time for temporally separating the previous and subsequent vibration waveforms from each other is inserted between respective vibration waveforms. The first non-vibration time only needs to be approximately 0.1 to 0.2 seconds, for example.

In a case where numbers having a plurality of digits are expressed, a second non-vibration time is inserted between vibration waveforms meaning the numbers of the respective digit. The second non-vibration time is favorably a time sufficiently longer than the first non-vibration time, for example, about 0.5 seconds in order to discriminate the second non-vibration time from the first non-vibration time.

Figure 6:
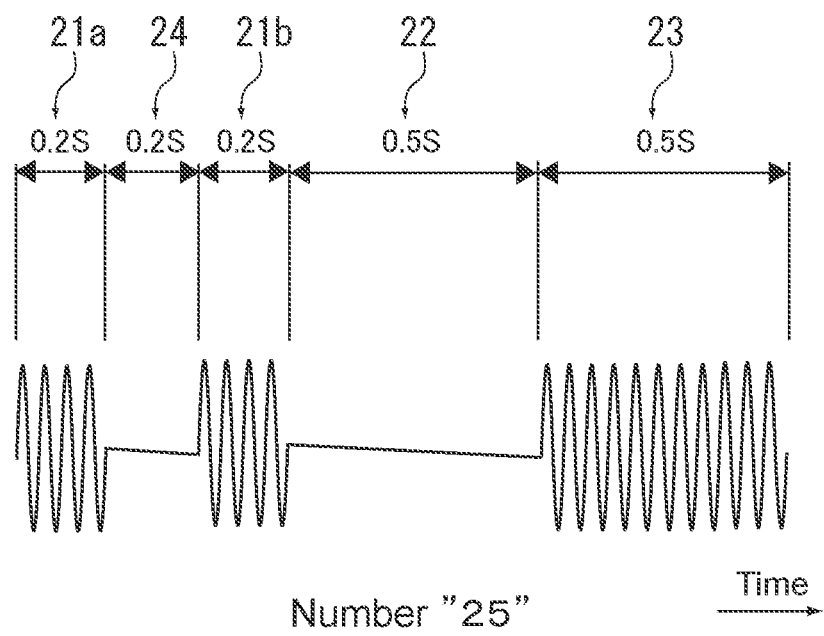
FIG. 6 A diagram showing an example of vibration waveforms expressing two-digit numbers.

Therefore, the two-digit numbers "25" are expressed by two 0.2-second vibration waveforms 21a and 21b which mean "2", a non-vibration time 22 corresponding to a second time, and a 0.5-second vibration 23 which means "5" as shown in FIG. 6. A first non-vibration time 24 is inserted between the two 0.2-second vibration waveforms 21a and 21b which mean "2".

Examples of the notification information using the numbers in this manner can include a time, the number of mail items, a remaining amount (left time) of the battery, remaining-amount notification of the Osaifu-Keitai (registered trademark), and the like.

(Vibration Waveform Expression of Time)

Figure 7A:
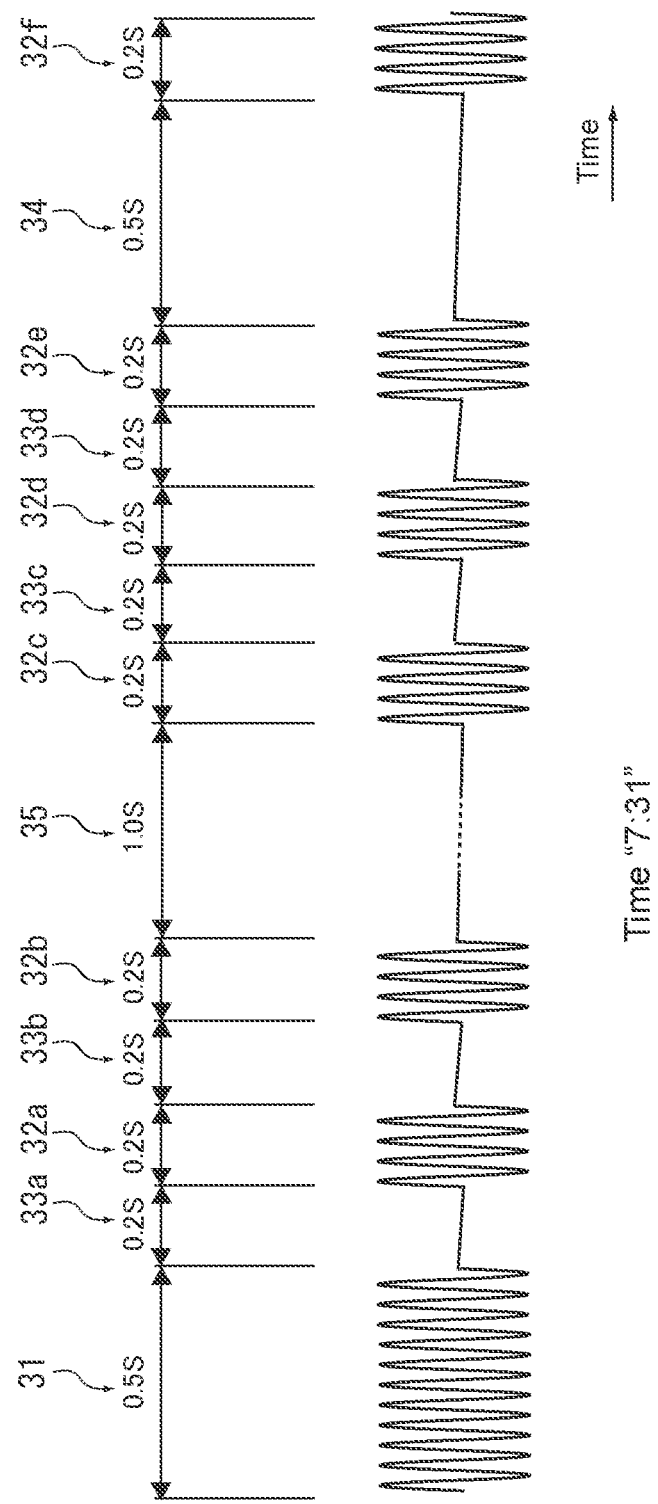
FIG. 7A A diagram showing an example of vibration waveforms expressing a time.

FIG. 7A is a diagram showing vibration waveforms expressing the time "7:31".

In this case, the numbers "7" and "31" are converted into corresponding vibration waveforms, respectively.

"Seven (7)" is expressed by a sequence of a 0.5-second vibration waveform 31 which means "5" and two 0.2-second vibration waveforms 32a and 32b which mean "2". A non-vibration time 33a or 33b corresponding to a first time is inserted between respective ones of the vibration waveforms 31, 32a, and 32b.

"Thirty-one (31)" is expressed by three 0.2-second vibration waveforms 32c, 32d, and 32e which mean "3", a non-vibration time 34 corresponding to the second time, and a single 0.2-second vibration waveform 32f which means "1". A non-vibration time 33c or 33d corresponding to the first time is inserted between respective ones of the three 0.2-second vibration waveforms 32c, 32d, and 32e which mean "3".

Further, a non-vibration time 35 corresponding to a third time is inserted between the vibration waveforms indicating "7" and the vibration waveforms indicating "31", for example. In this manner, they are separated from each other. For example, the third time is favorably a time sufficiently longer than the second time, for example, about 1 second.

Figure 7B:
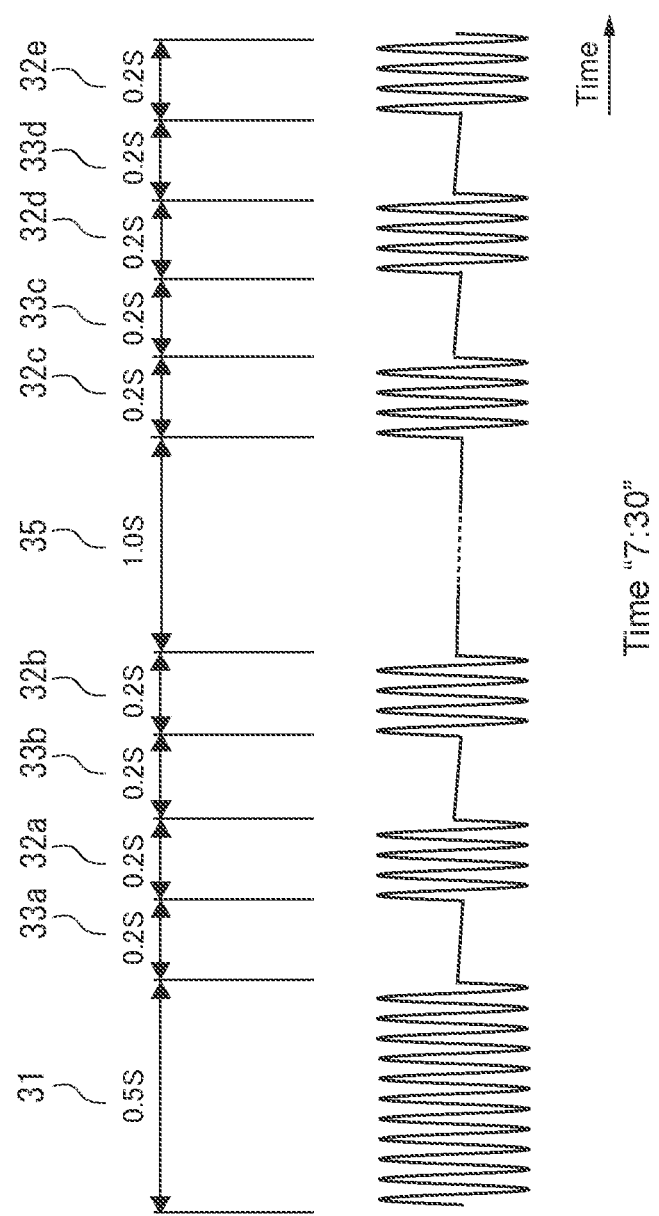
FIG. 7B A diagram showing an example of vibration waveforms expressing a rounded time.

It should be noted that conversion into vibration waveforms may be performed by rounding "7:31" to "7:30", for example. With this, as shown in FIG. 7B, the vibration waveforms are shortened and user's discrimination accuracy of the notification information can be enhanced.

(Vibration Waveform Expression of Number of Mail Items)

For example, in a case where the number of sent mail items is "125", "125" is converted into vibration waveforms corresponding to the respective numbers "1", "2", and "5". A non-vibration time for the second time is inserted between the vibration waveforms of the respective numbers. In this manner, shifts between the digits are expressed.

It should be noted that also in this case, conversion into vibration waveforms may be performed by rounding "125" to "120", for example. Further, "1571" may be rounded to "1500".

As described above, complicated and long-time vibration waveforms should be avoided in the information notification using the vibration waveform. By rounding the numbers of the lower digits such as the last digit and the last two digits to "0" as described above, the last part of the vibration waveforms is the 0.1-second vibration waveform, and the time duration of the all vibration waveforms is shortened. Therefore, the user's burden in recognizing the notification information on the basis of the vibration waveforms can be reduced. The number of numbers which many users can relatively easily recognize on the basis of a sequence of vibration waveforms is about two. The user may be enabled to set this number as appropriate in a manner that depends on preference of the user and an experience level of recognizing the notification information on the basis of the vibration waveforms.

A similar vibration waveform expression can be used also in the information notification such as the notification of the remaining amount (left time) of the battery and the remaining-amount notification of the Osaifu-Keitai (registered trademark).

Hereinabove, the case where the ten kinds of numbers are expressed by using the three kinds of vibration waveforms characterized by the vibration times has been described. The same applies to a case of using three kinds of vibration waveforms having different vibration frequencies or different vibration amplitudes Further, vibration waveforms based on a combination of the vibration time and the vibration frequency or vibration waveforms based on a combination of the vibration time and the vibration amplitude may be used.

(Regarding Vibration Waveforms Based on Combination of Vibration Time and Vibration Frequency)

Next, the vibration waveforms based on the combination of the vibration time and the vibration frequency and notification information favorable to be assigned thereto will be described.

The vibration waveforms based on the combination of the vibration time and the vibration frequency can be utilized for, for example, notification of information obtained by rounding "minutes" of a time.

Figure 8:
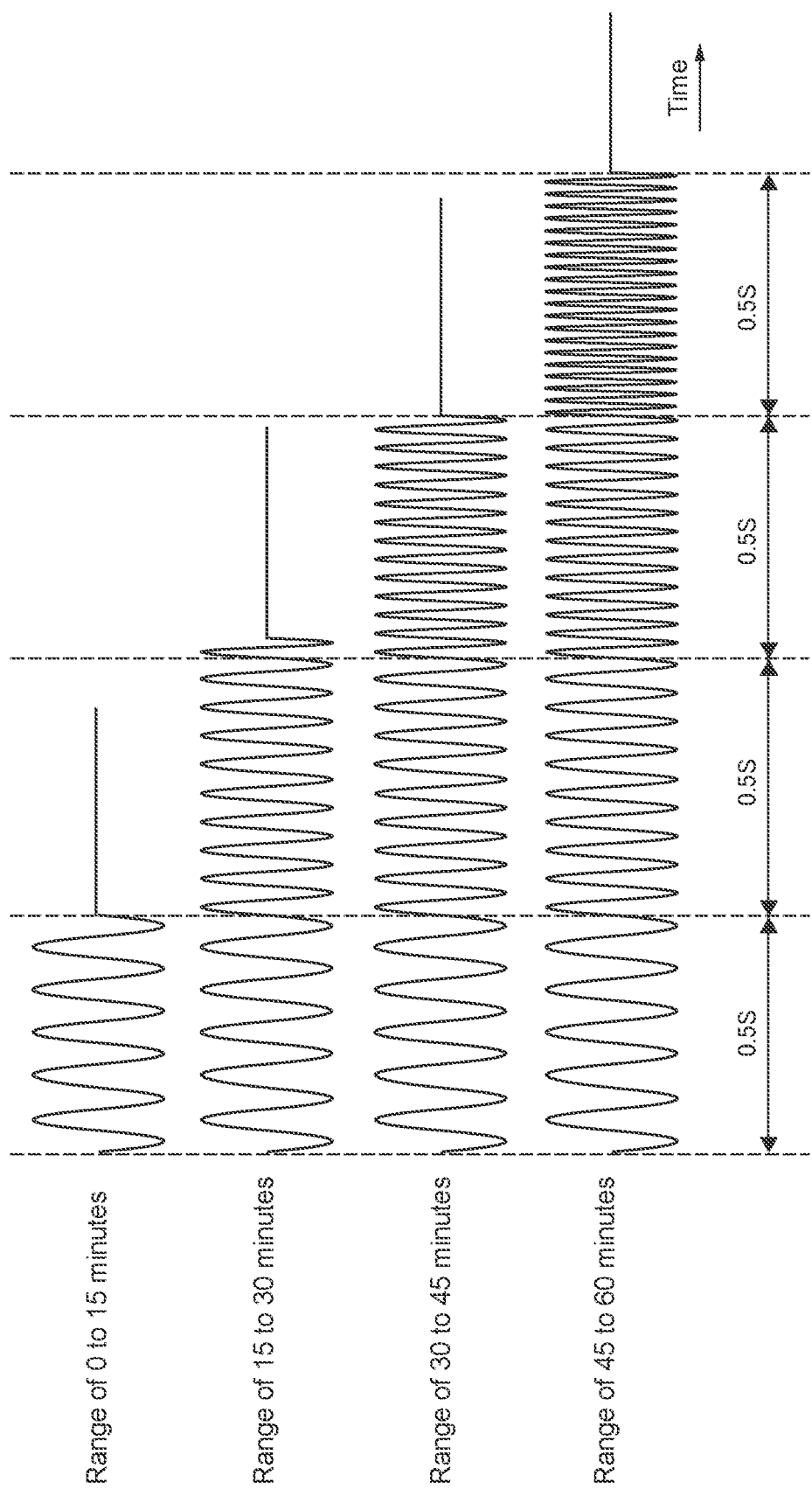
FIG. 8 A diagram showing an example of vibration waveforms assigned to respective time ranges obtained by dividing minutes (0 to 60 minutes) of a time into four equal parts each corresponding to 15 minutes.

FIG. 8 is a diagram showing an example of vibration waveforms assigned to respective time ranges obtained by dividing the minutes (0 to 60 minutes) of the time into four equal parts each corresponding to 15 minutes.

In this example, the 0.5-second vibration waveform at 100 Hz is assigned to a range of first 0 to 15 minutes as a first vibration waveform. A sequence of the first vibration waveform and the 0.5-second vibration waveform at 150 Hz directly following it is assigned to a range of next 15 to 30 minutes as a second vibration waveform. A sequence of the second vibration waveform and the 0.5-second vibration waveform at 200 Hz directly following it is assigned to a range of next 30 to 45 minutes as a third vibration waveform. Then, a sequence of the third vibration waveform and the 0.5-second vibration waveform at 250 Hz directly following it is assigned to a range of 45 to 60 minutes as a fourth vibration waveform.

With those vibration waveforms, the user can recognize the minute range of the time on the basis of the number of times the vibration frequency changes as well as the vibration time. The user can recognize the minute range of the time more easily and correctly as compared to the case of recognizing it only on the basis of the vibration time.

It should be noted that the above-mentioned respective vibration frequencies are exemplary, and the user can more favorably distinguish the respective vibration waveforms from one another by further increasing the difference between the respective frequencies. Alternatively, the minutes of the time may be fragmented and expressed in smaller ranges, for example, every 10 minutes or every 12 minutes by further increasing variables of the vibration frequencies.

Further, only the vibration frequency may be changed for each piece of information. That is, the 0.5-second vibration waveform at 100 Hz may be assigned to the range of first 0 to 15 minutes, the 0.5-second vibration waveform at 150 Hz may be assigned to the range of next 15 to 30 minutes, the 0.5-second vibration waveform at 200 Hz may be assigned to the range of next 30 to 45 minutes, and further the 0.5-second vibration waveform at 250 Hz may be assigned to the range of 45 to 60 minutes.

The vibration waveforms based on the combination of the vibration time and the vibration frequency can be utilized for notification of other various types of information. For example, the vibration waveforms based on the combination of the vibration time and the vibration frequency can be utilized as vibration waveforms for notification of weather report information. In particular, the level of the vibration frequency is associated with good feeling (bad feeling) of a person when receiving that vibration and it is generally known that feeling to vibration becomes better as the frequency becomes higher. By assigning vibration frequencies to kinds of weather report results in view of this, the user is enabled to easily recognize a weather report result meant by the vibration.

Hereinafter, an example of an assigning relationship between weather report results and vibration waveforms will be described.

A vibration waveform in which a plurality of 0.5-second vibrations at a high frequency (e.g., 300 Hz) are continuously caused while sandwiching a 0.2-second non-vibration time therebetween is assigned to "sunny".

A vibration waveform in which a plurality of 0.5-second vibrations at a relatively low frequency (e.g., 200 Hz) are continuously caused while sandwiching a 0.2-second non-vibration time therebetween is assigned to "cloudy".

A continuous vibration at a relatively low frequency (e.g., 200 Hz) is assigned to "rainy".

A vibration waveform in which a plurality of 0.5-second vibrations at a low frequency (e.g., 100 Hz) are continuously caused while sandwiching a 0.2-second non-vibration time therebetween is assigned to "snow".

A continuous vibration at a low frequency (e.g., 100 Hz) is assigned to "stormy and windy".

It should be noted that the assigning relationship between those types of weather and the vibration waveforms and the vibration waveforms are merely exemplary, and various other modifications can be made.

In addition, the user may be notified of navigation information while directions (left- and right-hand directions and front and rear directions) are associated with the vibration waveforms based on the combination of the vibration time and the vibration frequency.

Hereinafter, an example of an assigning relationship between directions and vibration waveforms will be described.

A vibration waveform in which a plurality of 0.5-second vibrations at a predetermined frequency (e.g., 200 Hz) are continuously caused while sandwiching a 0.5-second non-vibration time therebetween is assigned to "front".

A vibration waveform in which two 0.2-second vibrations at a predetermined frequency (e.g., 200 Hz), which sandwich a 0.2-second interval therebetween, are continuously caused while sandwiching a 0.5-second non-vibration time therebetween is assigned to "right".

A vibration waveform in which three 0.2-second vibrations at a predetermined frequency (e.g., 200 Hz), which sandwich a 0.2-second interval therebetween, are continuously caused while sandwiching a 0.5-second non-vibration time therebetween is assigned to "left".

A vibration waveform continuous at a predetermined frequency (e.g., 200 Hz) or a vibration waveform continuous for several seconds is assigned to "rear".

It should be noted that the assigning relationship between those types of weather and the vibration waveforms and the vibration waveforms are merely exemplary, and various other modifications can be made.

(Regarding Vibration Waveforms Based on Combination of Vibration Time and Vibration Amplitude)

Next, the vibration waveforms based on the combination of the vibration time and the vibration amplitude and notification information favorable to be assigned thereto will be described.

For example, it is assumed that in user's schedule management using the information processing apparatus 100, the scheduled time and date are set by the user and processing of notifying the user of a left time until those scheduled time and date in vibration waveforms is performed. By generating vibration waveforms whose total vibration energy becomes larger as the left time until the scheduled time and date becomes shorter, the user is given warning at a higher intensity.

Figure 9:
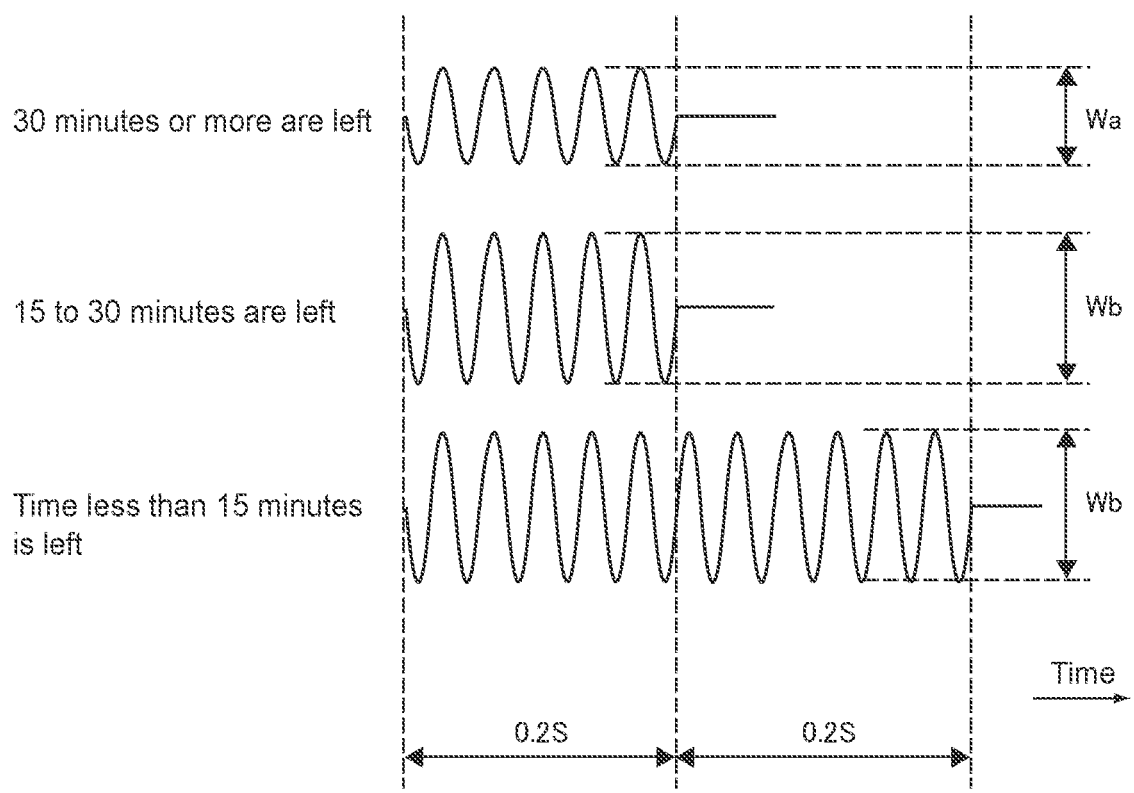
FIG. 9 A diagram showing an example of an assigning relationship between vibration waveforms based on a combination of a vibration time and a vibration amplitude and left times to scheduled times and dates.

FIG. 9 is a diagram showing an example of an assigning relationship between vibration waveforms based on the combination of the vibration time and the vibration amplitude and left times until the scheduled times and dates.

In this example, a 0.2-second vibration waveform having a relatively small amplitude Wa is assigned as the first vibration waveform for a case where the left time until the scheduled time and date is 30 minutes or more. A 0.2-second vibration waveform having an amplitude Wb larger than that of the first vibration waveform is assigned as the second vibration waveform for a case where the left time until the scheduled time and date is 15 minutes or more and less than 30 minutes. Then, a 0.4-second vibration waveform having the same amplitude Wb as the second vibration waveform and whose vibration time is longer than that of the second vibration waveform is assigned as the third vibration waveform for a case where the left time until the scheduled time and date is less than 15 minutes.

It should be noted that it is desirable that the amplitude Wa and the amplitude Wb have a sufficient difference therebetween in order to ensure that the user senses a difference of vibration intensity. For example, it is desirable that the amplitude Wb be at least about twice as large as the amplitude Wa.

By generating vibration waveforms whose total vibration energy becomes larger as the left time until the scheduled time and date is shorter in this manner, more intensive vibration is given to the user. With this, the user can intuitively grasp the level of the left time until the scheduled time and date.

It should be noted that although the vibration waveforms based on the combination of the vibration time and the vibration amplitude are set to the vibration waveforms indicating the information regarding the left time until the scheduled time and date in this example, the information may be assigned only to the vibration amplitude. Further, the vibration amplitude may be varied at three or more stages. The vibration time may also be varied at three or more stages.

Effects of this Embodiment

With the information processing apparatus 100 of this embodiment described hereinabove, it is possible to receive the notification information output from the information processing apparatus 100 on the basis of the vibration waveforms transmitted from the information processing apparatus 100, leaving this information processing apparatus 100 in the pocket of the clothes of the user even without looking at the screen of the display 2.

Further, in accordance with the information processing apparatus 100 of this embodiment, a tap on the information processing apparatus 100 enables output instruction of the notification information using the vibration waveforms to be given to the information processing apparatus 100, leaving the information processing apparatus 100 in the pocket of the clothes of the user. Therefore, a series of user interfaces from the output instruction of the notification information to giving the notification information to the user is achieved in a state in which the information processing apparatus 100 is still in the pocket of the clothes of the user.

Modified Example 1

(Control on Vibration Intensity Depending on Pressure Applied on Information Processing Apparatus)

In a case where the information processing apparatus is put in the pocket of the clothes of the user, a degree of transmission of vibration to a human body varies in a manner that depends on a pocket position and the like. For example, comparing a case where the information processing apparatus is put in a side pocket of a jacket and a case where the information processing apparatus is put in a chest pocket or a pants pocket, the vibration is not easily transmitted to the human body generally in the former. It can be because the information processing apparatus put in the chest pocket or the pants pocket is constantly liable to pressure from the human body rather than in a case where the information processing apparatus is put in the side pocket of the jacket. Therefore, there is a possibility that the vibration is not sufficiently transmitted to the user and the information notification using the vibration waveform fails in the case where the information processing apparatus is put in the side pocket of the jacket.

In view of that point, an information processing apparatus of this Modified Example 1 includes a pressure-sensitive sensor for detecting a pressure externally applied on the casing. The arithmetic processing unit is configured to control the vibration intensity in a manner that depends on a pressure applied on the casing of the information processing apparatus. The arithmetic processing unit performs control to generate more intensive vibration (having larger amplitude) in the vibration device as the detected pressure becomes lower. With this, for example, the possibility that the vibration waveform can be transmitted to the user even if the information processing apparatus is put in a location where the vibration is not easily transmitted to the user, such as the side pocket of the jacket, increases.

With this, for example, even if the information processing apparatus 100 is put in the pocket in which vibration is not easily transmitted to the human body, such as the side pocket of the jacket, the user can be favorably notified of the information using the vibration waveforms.

It should be noted that although the vibration intensity is varied by varying the vibration amplitude here, the total vibration energy using the vibration waveforms may be varied by varying the vibration time or varying the number of repeated vibration waveforms, for example.

Further, the above-mentioned control on vibration intensity depending on a pressure applied on the information processing apparatus is effective also in a case where the information processing apparatus is put in a bag. In a case where the information processing apparatus and other objects are stuffed into the bag, vibrations of the information processing apparatus are transmitted to the entire bag. Therefore, the user easily senses the vibrations. Otherwise, in a case where the information processing apparatus is put in the bag with room, vibrations are absorbed in the bag and become not easily transmitted to the user. In the case where the information processing apparatus is put in the bag with room, a pressure detected by the pressure-sensitive sensor is lower. Therefore, the arithmetic processing unit can cover the amount of vibration absorbed in the bag by increasing the vibration intensity.

Modified Example 2

(Control on Vibration Intensity Depending on Noise Level of Location where User is)

It is conceivable that in some locations where the user is, the vibration emitted from the information processing apparatus is erased by surrounding noise and is not sufficiently transmitted to the user. An information processing apparatus of this Modified Example 2 is configured such that the arithmetic processing unit optimally controls the vibration intensity in a manner that depends on a noise level at a location where the user is.

Methods for obtaining the noise level at the location where the user is are as follows, for example.

1. To collect environment sound through a microphone of the information processing apparatus and calculate a noise level by the arithmetic processing unit.

2. To acquire, from a database in which location information is associated with statistically obtained noise level information, a noise level associated with the location information which is calculated on the basis of the GPS information obtained from the GPS processing circuit by the arithmetic processing unit. The database may be constructed at a server over the Internet or may be provided in storage of the information processing apparatus.

With this, for example, the vibration device is vibrated at low vibration intensity in a location having a relatively low noise level, such as a library and a meeting room, and the vibration device is vibrated at high vibration intensity in a location having a relatively high noise level, such as a shopping area and an amusement area. With this, the probability that the user can be notified of the information using the vibration waveforms is enhanced even in a location having a high noise level.

Modified Example 3

(Control on Vibration Intensity Depending on Stationary or Moving State of User)

In an information processing apparatus of this Modified Example 3, the arithmetic processing unit is configured to determine whether the user is moving or is stationary on the basis of the data detected by the accelerometer. If the user is moving, the vibration intensity is set to be higher than in a case where the user stops. With this, the probability that the vibration waveforms emitted from the information processing apparatus can be sensed by the user even when the user is moving can be increased.

Modified Example 4

(Application to Wrist Band-Type Wearable Apparatus)

Figure 10:
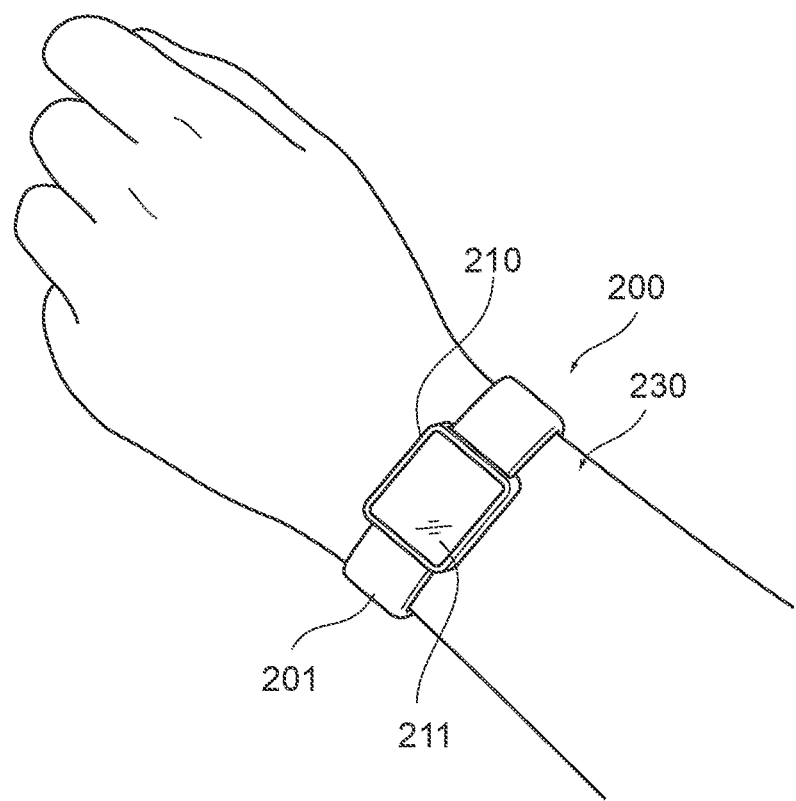
FIG. 10 A perspective view showing a wrist band-type wearable apparatus which is Modified Example 4 using the present technology.

The information notification using the vibration waveform can be applied also to a wrist band-type wearable apparatus 200 wearable on a wrist 230 of the user as shown in FIG. 10, for example. Further, the information notification using the vibration waveform is also applicable to a wearable apparatus wearable on various other wearing portions at which a tactile sense can be obtained, such as a neck, an ankle, a body, and a head.

Figure 11:
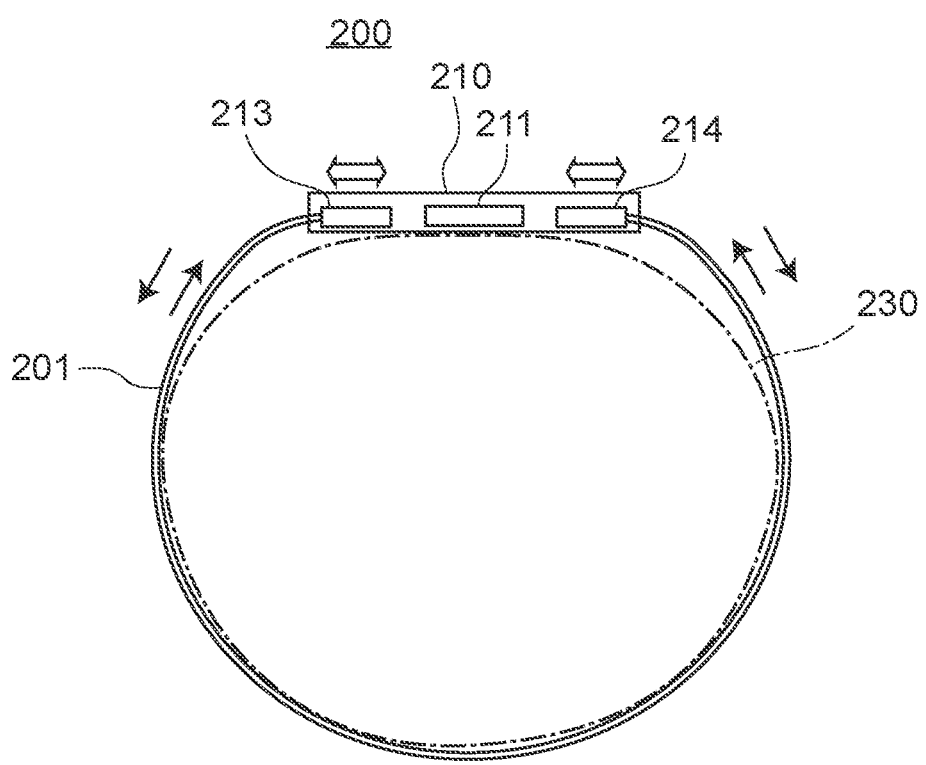
FIG. 11 A cross-sectional view of the wrist band-type wearable apparatus of Modified Example 4.

FIG. 11 is a cross-sectional view of the wrist band-type wearable apparatus 200 of Modified Example 4.

As shown in FIGS. 10 and 11, this wrist band-type wearable apparatus 200 includes a belt member 201 and an apparatus main body 210. A pair of both end portions of the apparatus main body 210 are respectively coupled to both ends of the belt member 201 in a longitudinal direction such that the belt member 201 and the apparatus main body 210 have an annular shape as a whole. The apparatus main body 210 includes a display 211 with a touch sensor panel, an arithmetic processing unit 212, two vibration devices 213 and 214, and the like. The apparatus main body 210 additionally includes a microphone, an accelerometer, a proximity sensor, a GPS processing circuit, and the like.

The two vibration devices 213 and 214 are provided in a vicinity of one coupling portion of the apparatus main body 210 with the belt member 201 and in a vicinity of the other coupling portion. The two vibration devices 213 and 214 are configured to be driven in vibration waveforms synchronized with each other to pull the both ends of the belt member 201 coupled with the apparatus main body 213 toward the apparatus main body 213 at the same time or restore them at the same time by a length corresponding to each vibration amplitude level. With this, intermittent sense of pressure is given to the wrist 230 of the user wearing this wrist band-type wearable apparatus 200 and the user is notified of the information using the vibration waveforms.

It should be noted that the vibration device may be provided in only either one of the vicinity of the one coupling portion of the apparatus main body 210 with the belt member 201 or the vicinity of the other coupling portion.

Modified Example 5

(Wrist Band-Type Wearable Apparatus Including Plurality of Vibration Devices)

Figure 12:
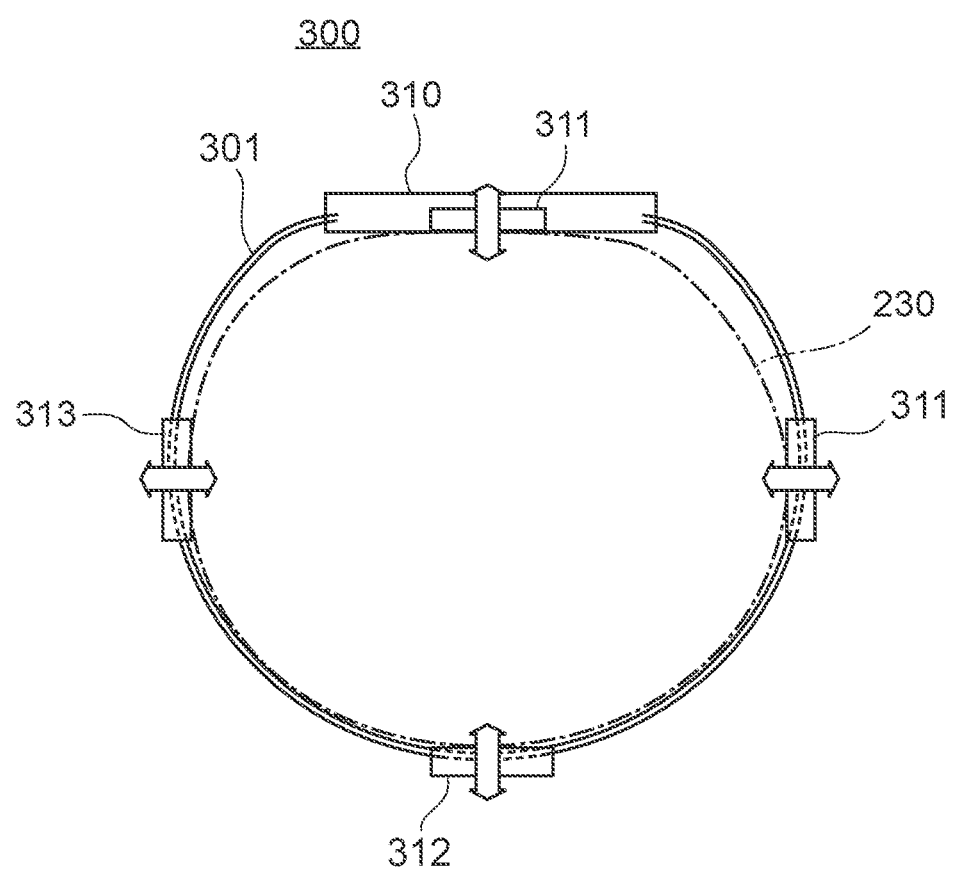
FIG. 12 A cross-sectional view showing a wrist band-type wearable apparatus including a plurality of vibration devices, which is Modified Example 5 using the present technology.

FIG. 12 is a cross-sectional view showing a wrist band-type wearable apparatus including a plurality of vibration devices.

This wrist band-type wearable apparatus 300 includes a belt member 301, an apparatus main body 310, and four vibration devices 311, 312, 313, and 314. The apparatus main body 310 includes a display with a touch sensor panel, an arithmetic processing unit, a microphone, an accelerometer, a proximity sensor, a GPS processing circuit, and the like.

One vibration device 311 of the four vibration devices 311, 312, 313, and 314 is provided in the apparatus main body 310. Other three vibration devices 312, 313, and 314 are provided in the belt member 301. The four vibration devices 311, 312, 313, and 314 are arranged at approximately equal intervals in a circumferential direction of an annular shape formed by the belt member 301 and the apparatus main body 310 when worn on the wrist 230 of the user. Vibration directions of the four vibration devices 311, 312, 313, and 314 only need to be directions in which pressures are efficiently applied to the wrist 230 of the user from the outside, for example.

By sensing which of the vibration devices 311, 312, 313, and 314 is vibrating with a tactile sense, the user wearing the wrist band-type wearable apparatus 300 having such a configuration on the wrist 230 can acquire information, which is assigned to that vibrating vibration device 311, 312, 313, or 314 in advance, as the notification information. Alternatively, the information notification can be performed on the basis of a combination of a plurality of vibrating vibration devices 311, 312, 313, and 314, the order of a plurality of vibrating vibration devices 311, 312, 313, and 314, and the like.

It should be noted that the present technology is not limited to the smartphone and the wrist band-type wearable apparatus and can be applied also to a necklace-type wearable apparatus, a head-mounted display, and the like.

Modified Example 6

In addition, in the present technology, the processing of the arithmetic processing unit 1 of the above-mentioned information processing apparatus 100 (information processing terminal) can be performed at a control unit of a cloud server (information processing apparatus) over the network. The arithmetic processing unit 1 of the above-mentioned information processing apparatus 100 sends detection data necessary for tap detection of the accelerometer 4 and the like to the cloud server over the network. The control unit of the cloud server performs tap operation detection on the basis of this detection data. If the tap operation is detected, the control unit of the cloud server generates the notification information to the user of the information processing apparatus 100, converts this notification information into the vibration waveform information of the vibration device 8 of the information processing apparatus 100, and sends it to the information processing apparatus 100. The arithmetic processing unit 1 of the information processing apparatus 100 outputs the control information including the vibration waveform information, which is received by the cloud server, to the vibration device-driving circuit 9 to thereby drive the vibration device 8.

In addition, the present technology can also take the following configurations.

(1) An information processing apparatus, including:
a vibration device that generates vibration; and
a control unit that detects a tap operation of a user for instructing to perform information notification, generates notification information when the tap operation is detected, converts the generated notification information into a vibration waveform, and causes the vibration device to vibrate in the vibration waveform.

(2) The information processing apparatus according to (1), in which
the control unit is configured to determine whether the information processing apparatus is put in a pocket of the user and start detection of the tap operation if it is determined that the information processing apparatus is put in the pocket of the user.

(3) The information processing apparatus according to (1) or (2), in which
the control unit is configured to convert the notification information into one or more vibration waveforms distinguishable on the basis of at least a vibration time.

(4) The information processing apparatus according to any of (1) to (3), further including
a pressure-sensitive sensor that detects a pressure applied on the information processing apparatus, in which
the control unit is configured to cause the vibration device to be driven at higher vibration intensity as the detected pressure becomes lower.

(5) The information processing apparatus according to any of (1) to (4), in which
the control unit is configured to acquire information regarding a noise level and cause the vibration device to be driven at higher vibration intensity as the noise level becomes higher.

(6) The information processing apparatus according to any of (1) to (5), in which
the control unit is configured to acquire location information, search, on the basis of the acquired location information, a database in which information regarding a noise level in each location is stored, and acquire the information regarding the noise level corresponding to the acquired location information.

(7) The information processing apparatus according to any of (1) to (6), in which
the control unit is configured to determine whether the information processing apparatus is moving and control the vibration device such that the vibration intensity becomes higher if the information processing apparatus is moving.

(8) The information processing apparatus according to any of (1), (2), and (4) to (7), in which the control unit is configured to convert the notification information into one or more vibration waveforms distinguishable on the basis of the vibration time and the vibration amplitude.

(9) The information processing apparatus according to any of (1), (2), and (4) to (7), in which
the control unit is configured to convert the notification information into a sequence of one or more vibration waveforms distinguishable on the basis of a vibration time and a vibration frequency.

(10) An information processing method, including:
by a control unit,
detecting a tap operation of a user for instructing an information processing apparatus including a vibration device that generates vibration to perform information notification;
generating notification information when the tap operation is detected;
converting the generated notification information into a vibration waveform; and
causing the vibration device to vibrate in the vibration waveform.

(11) The information processing method according to (10), in which
the control unit determines whether the information processing apparatus is put in a pocket of the user and starts detection of the tap operation if it is determined that the information processing apparatus is put in the pocket of the user.

(12) The information processing method according to (10) or (11), in which
the control unit converts the notification information into one or more vibration waveforms distinguishable on the basis of at least a vibration time.

(13) The information processing method according to any of (10) to (12), in which
the control unit causes the vibration device to be driven at higher vibration intensity as a pressure applied on the information processing apparatus, which is detected by a pressure-sensitive sensor, becomes lower.

(14) The information processing method according to any of (10) to (13), in which
the control unit acquires information regarding a noise level and causes the vibration device to be driven at higher vibration intensity as the noise level becomes higher.

(15) The information processing method according to any of (10) to (14), in which
the control unit acquires location information, searches, on the basis of the acquired location information, a database in which information regarding a noise level in each location is stored, and acquires the information regarding the noise level corresponding to the acquired location information.

(16) The information processing method according to any of (10) to (15), in which
the control unit determines whether the information processing apparatus is moving and controls the vibration device such that the vibration intensity becomes higher if the information processing apparatus is moving.

(17) The information processing method according to any of (10), (11), and (13) to (16), in which
the control unit converts the notification information into one or more vibration waveforms distinguishable on the basis of the vibration time and the vibration amplitude.

(18) The information processing method according to any of (10), (11), and (13) to (16), in which
the control unit converts the notification information into a sequence of one or more vibration waveforms distinguishable on the basis of a vibration time and a vibration frequency.

(19) A program that causes a computer to operate as
a control unit that detects a tap operation of a user for instructing an information processing apparatus including a vibration device that generates vibration to perform information notification, generates notification information when the tap operation is detected, converts the generated notification information into a vibration waveform, and causes the vibration device to vibrate in the vibration waveform.

(20) The program according to (19), in which
the control unit determines whether the information processing apparatus is put in a pocket of the user and starts detection of the tap operation if it is determined that the information processing apparatus is put in the pocket of the user.

(21) The program according to (19) or (20), in which
the control unit converts the notification information into one or more vibration waveforms distinguishable on the basis of at least a vibration time.

(22) The program according to any of (19) to (21), in which
the information processing apparatus includes a pressure-sensitive sensor that detects a pressure applied on this information processing apparatus, and
the control unit causes the vibration device to be driven at higher vibration intensity as the detected pressure becomes lower.

(23) The program according to any of (19) to (22), in which
the control unit acquires information regarding a noise level and causes the vibration device to be driven at higher vibration intensity as the noise level becomes higher.

(24) The program according to any of (19) to (23), in which
the control unit acquires location information, searches, on the basis of the acquired location information, a database in which information regarding a noise level in each location is stored, and acquires the information regarding the noise level corresponding to the acquired location information.

(25) The program according to any of (19) to (24), in which
the control unit determines whether the information processing apparatus is moving and controls the vibration device such that the vibration intensity becomes higher if the information processing apparatus is moving.

(26) The program according to any of (19), (20), and (22) to (25), in which
the control unit converts the notification information into one or more vibration waveforms distinguishable on the basis of the vibration time and the vibration amplitude.

(27) The program according to any of (19), (20), and (22) to (25), in which
the control unit converts the notification information into a sequence of one or more vibration waveforms distinguishable on the basis of a vibration time and a vibration frequency.

(28) An information processing apparatus, including
a control unit that receives output information of a sensor, which is sent from an information processing terminal including a vibration device that generates vibration and the sensor that detects acceleration, detects, on the basis of the received output information of the sensor, a tap operation of a user for instructing the information processing terminal to perform information notification, generates notification information when the tap operation is detected, converts the generated notification information into vibration waveform information of the vibration device, and performs control to send the converted vibration waveform information to the information processing terminal.

(29) The information processing apparatus according to (28), in which the control unit is configured to determine whether the information processing apparatus is put in a pocket of the user and instruct the information processing terminal to start detection of the tap operation if it is determined that the information processing apparatus is put in the pocket of the user.

(30) The information processing apparatus according to (28) or (29), in which the control unit is configured to convert the notification information into one or more vibration waveforms distinguishable on the basis of at least a vibration time.

(31) The information processing apparatus according to any of (28) to (30), in which the control unit is configured to receive, from the information processing terminal, data regarding a pressure applied on the information processing terminal, which is detected by a pressure-sensitive sensor of the information processing terminal and instruct the information processing terminal to cause the vibration device to be driven at higher vibration intensity as the received pressure becomes lower.

(32) The information processing apparatus according to any of (28) to (31), in which the control unit is configured to acquire information regarding a noise level in a location where the information processing terminal is and instruct the information processing terminal to cause the vibration device to be driven at higher vibration intensity as the noise level becomes higher.

(33) The information processing apparatus according to any of (28) to (32), in which the control unit is configured to determine whether the information processing terminal is moving and perform instruction such that the vibration intensity of the vibration device becomes higher if the information processing terminal is moving.

(34) The information processing apparatus according to any of (28), (29), and (31) to (33), in which the control unit is configured to convert the notification information into one or more vibration waveforms distinguishable on the basis of the vibration time and the vibration amplitude.

(35) The information processing apparatus according to any of (28), (29), and (31) to (33), in which the control unit is configured to convert the notification information into a sequence of one or more vibration waveforms distinguishable on the basis of a vibration time and a vibration frequency.

The present technology is not limited only to the above-mentioned embodiments and various changes can be made without departing from the gist of the present technology as a matter of course.

REFERENCE SIGNS LIST 1 arithmetic processing unit
2 display
3 camera unit
4 accelerometer
5 proximity sensor
6 gyroscope
7 GPS processing circuit
8 vibration device
9 vibration device-driving circuit
100 information processing apparatus

The invention claimed is:

1. An information processing apparatus, comprising:
a vibration device configured to; and
a control unit configured to:
   detect a tap operation of a user;
   generate notification information based on the detected tap operation;
   assign a first vibration frequency to the generated notification information, based on content of the generated notification information;
   convert the generated notification information into a vibration waveform,
      wherein the vibration waveform corresponds to at least one vibration having the assigned first vibration frequency;
   determine that the information processing apparatus is in one of a stationary state or a moving state; and
   control vibration intensity of the vibration device based on
      the vibration waveform, and
      the determination that the information processing apparatus is in the moving state,
      wherein the vibration intensity of the vibration device in the moving state is higher than the vibration intensity of the vibration device in the stationary state.

2. The information processing apparatus according to claim 1, wherein
the control unit is further configured to determine that the information processing apparatus is put in a pocket of the user, and
the tap operation is detected based on the determination that the information processing apparatus is put in the pocket of the user.

3. The information processing apparatus according to claim 1, wherein
the control unit is further configured to convert the generated notification information into at least one vibration waveform, and
the at least one vibration waveform is distinguishable based on at least a vibration time of the at least one vibration waveform.

4. The information processing apparatus according to claim 1, further comprising a pressure-sensitive sensor configured to detect a pressure applied on the information processing apparatus, wherein
the control unit is further configured to control the vibration device to increase the vibration intensity based on a decrease in the detected pressure.

5. The information processing apparatus according to claim 1, wherein the control unit is further configured to:
acquire information corresponding to a noise level; and
control the vibration device to increase the vibration intensity based on an increase in the noise level.

6. The information processing apparatus according to claim 1, wherein the control unit is further configured to:
acquire location information of the information processing apparatus;
search, based on the acquired location information, a database comprising first information corresponding to a plurality of noise levels at a plurality of locations; and
acquire, from the database, second information corresponding to a noise level of the plurality of noise levels associated with the acquired location information.

7. The information processing apparatus according to claim 1, wherein
the control unit is further configured to convert the generated notification information into at least one vibration waveform, and
the at least one vibration waveform is distinguishable based on a vibration time and a vibration amplitude of the at least one vibration waveform.

8. The information processing apparatus according to claim 1, wherein
the control unit is further configured to convert the generated notification information into a sequence of vibration waveforms, and
the sequence of vibration waveforms is distinguishable based on a vibration time and a second vibration frequency associated with each vibration waveform of the sequence of vibration waveforms.

9. An information processing method, comprising:
in a control unit of an information processing apparatus:
detecting a tap operation of a user;
generating notification information based on the detected tap operation;
assigning a vibration frequency to the generated notification information, based on content of the generated notification information;
converting the generated notification information into a vibration waveform,
wherein the vibration waveform corresponds to at least one vibration having the assigned vibration frequency;
determining that the information processing apparatus is in one of a stationary state or a moving state; and
controlling vibration intensity of a vibration device of the information processing apparatus based on
the vibration waveform, and
the determination that the information processing apparatus is in the moving state,
wherein the vibration intensity of the vibration device in the moving state is higher than the vibration intensity of the vibration device in the stationary state.

10. A non-transitory computer-readable medium having stored thereon, computer-executable instructions which, when executed by a processor, cause the processor to execute operations, the operations comprising:
detecting a tap operation of a user;
generating notification information based on the detected tap operation;
assigning a vibration frequency to the generated notification information, based on content of the generated notification information;
converting the generated notification information into a vibration waveform,
wherein the vibration waveform corresponds to at least one vibration having the assigned vibration frequency;
determining that an information processing apparatus is in one of a stationary state or a moving state; and
controlling vibration intensity of a vibration device of the information processing apparatus based on
the vibration waveform, and
the determination that the information processing apparatus is in the moving state,
wherein the vibration intensity of the vibration device in the moving state is higher than the vibration intensity of the vibration device in the stationary state.

11. An information processing apparatus, comprising:
a control unit configured to:
detect a tap operation of a user;
generate notification information based on the detected tap operation;
assign a vibration frequency to the generated notification information, based on content of the generated notification information;
convert the generated notification information into vibration waveform information,
wherein the vibration waveform information comprises at least one vibration having the assigned vibration frequency; and
transmit the vibration waveform information to an information processing terminal, wherein
the information processing terminal controls vibration intensity of a vibration device of the information processing terminal, based on the vibration waveform information transmitted from the information processing apparatus and a determination that the information processing terminal is in a moving state, and
the vibration intensity of the vibration device in the moving state is higher than the vibration intensity of the vibration device in a stationary state.

12. An information processing apparatus, comprising:
a vibration device configured to vibrate; and
a control unit configured to:
detect a tap operation of a user;
generate notification information based on the detected tap operation;
assign a vibration frequency to the generated notification information, based on content of the generated notification information;
convert the generated notification information into a vibration waveform,
wherein the vibration waveform corresponds to at least one vibration having the assigned vibration frequency;
acquire location information of the information processing apparatus;
search, based on the acquired location information, a database comprising first information corresponding to a plurality of noise levels at a plurality of locations;
acquire, from the database, second information corresponding to a noise level of the plurality of noise levels associated with the acquired location information; and
control the vibration device, based on the vibration waveform and the acquired second information.

* * * * *